US008825319B2

(12) United States Patent
Whitney et al.

(10) Patent No.: US 8,825,319 B2
(45) Date of Patent: Sep. 2, 2014

(54) AUTOMATIC TRANSMISSION INPUT CLUTCH CONTROL

(71) Applicant: GM Global Technology Operations LLC, Detroit, MI (US)

(72) Inventors: Christopher E. Whitney, Commerce, MI (US); Klaus Pochner, Russelsheim (DE); Colin Hultengren, New Hudson, MI (US); Krishnedu Kar, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/767,320

(22) Filed: Feb. 14, 2013

(65) Prior Publication Data
US 2013/0311055 A1     Nov. 21, 2013

Related U.S. Application Data

(60) Provisional application No. 61/649,665, filed on May 21, 2012.

(51) Int. Cl.
*B60W 10/06* (2006.01)
*B60W 10/02* (2006.01)
*B60W 30/18* (2012.01)

(52) U.S. Cl.
CPC ... *B60W 30/18027* (2013.01); *B60W 30/18063* (2013.01); *B60W 10/02* (2013.01); *B60W 10/06* (2013.01); *B60W 2710/065* (2013.01); *B60W 2720/106* (2013.01); *B60W 2710/0666* (2013.01)

USPC .............. 701/54; 701/60; 701/67; 477/73; 477/83

(58) Field of Classification Search
CPC ............... B60W 30/18027; B60W 30/18063; B60W 2710/065; B60W 2710/0666; B60W 2720/106; B60W 2050/0012; B60W 10/02; B60W 10/06
See application file for complete search history.

(56) References Cited

U.S. PATENT DOCUMENTS

| 5,316,116 | A | * | 5/1994 | Slicker et al. | 477/181 |
| 2002/0072447 | A1 | * | 6/2002 | Genise | 477/77 |
| 2006/0205563 | A1 | * | 9/2006 | Bai et al. | 477/180 |
| 2008/0119328 | A1 | * | 5/2008 | Satou et al. | 477/181 |
| 2011/0288735 | A1 | * | 11/2011 | Shelton et al. | 701/68 |

* cited by examiner

*Primary Examiner* — Michael J Zanelli
(74) *Attorney, Agent, or Firm* — Quinn Law Group, PLLC (57) ABSTRACT

A method of controlling the performance of a vehicle from a stationary condition includes operating a vehicle powertrain in a creep mode following the disengagement of a driver-operated braking device; and operating the vehicle powertrain in a launch mode following an engagement of a driver-operated acceleration device subsequent to the disengagement of the driver-operated braking device. Operating a vehicle powertrain in a creep mode includes: applying a friction clutch to couple an engine crankshaft of the vehicle powertrain with an input shaft of the transmission; determining a torque command to accelerate the vehicle powertrain at a predetermined rate; providing the torque command to an engine controller to controllably increase the input torque to the transmission; and operating a closed loop engine speed control module to prevent the crankshaft speed from slowing below a predetermined engine idle speed.

20 Claims, 5 Drawing Sheets

AUTOMATIC TRANSMISSION INPUT CLUTCH CONTROL

CROSS REFERENCE TO RELATED APPLICATIONS

This application claims the benefit of U.S. Provisional Application No. 61/649,665, filed May 21, 2012, which is hereby incorporated by reference in its entirety.

TECHNICAL FIELD

The present invention relates generally to engine torque control.

BACKGROUND

Modern vehicles are frequently equipped with multi-speed, dual-clutch transmissions (DCT) as part of the subject vehicle's powertrain. Such DCTs are favored for their increased mechanical efficiency in comparison with typical, torque-converter equipped automatic transmissions.

A typical DCT employs two friction clutches for shifting among its forward ratios, and accomplishes such shifts by alternating engagement between one and the other of the two friction clutches. Such a multi-speed, dual-clutch transmission may be utilized in a hybrid vehicle, i.e., a vehicle employing two or more distinct power sources, such as an engine and an electric motor, for transmitting propulsion energy to the subject vehicle's driven wheels.

As with DCT's, other transmission configurations may use friction clutches in a series arrangement with the transmission input shaft to selectively isolate the transmission from the engine.

SUMMARY

A method of controlling the performance of a vehicle from a stationary condition includes operating a vehicle powertrain in a creep mode following the disengagement of a driver-operated braking device; and operating the vehicle powertrain in a launch mode following an engagement of a driver-operated acceleration device subsequent to the disengagement of the driver-operated braking device.

In one configuration, operating a vehicle powertrain in a creep mode may includes: applying a friction clutch to couple an engine crankshaft of the vehicle powertrain with an input shaft of the transmission; determining a torque command to accelerate the vehicle powertrain at a predetermined rate; providing the torque command to an engine controller to controllably increase the input torque to the transmission; and operating a closed loop engine speed control module to prevent the crankshaft speed from slowing below a predetermined engine idle speed.

Likewise, operating a vehicle powertrain in a launch mode may include providing a propulsion torque command to the engine controller in a closed-loop manner to accelerate the vehicle at a desired launch rate, and increasing an engine speed set point following the engagement of the driver-operated accelerator device.

In one configuration, the creep mode may be deactivated if the driver-operated braking device is re-engaged prior to the engagement of a driver-operated acceleration device. Deactivating the creep mode may includes disengaging the friction clutch to decouple the engine crankshaft from the input shaft of the transmission.

The launch mode may be deactivated once the speed of the transmission input shaft meets the engine speed set point. Deactivating the launch mode may then include varying the propulsion torque command directly in response to the engagement of a driver-operated acceleration device.

The above features and advantages and other features and advantages of the present invention are readily apparent from the following detailed description of the best modes for carrying out the invention when taken in connection with the accompanying drawings.

DETAILED DESCRIPTION

Figure 1:
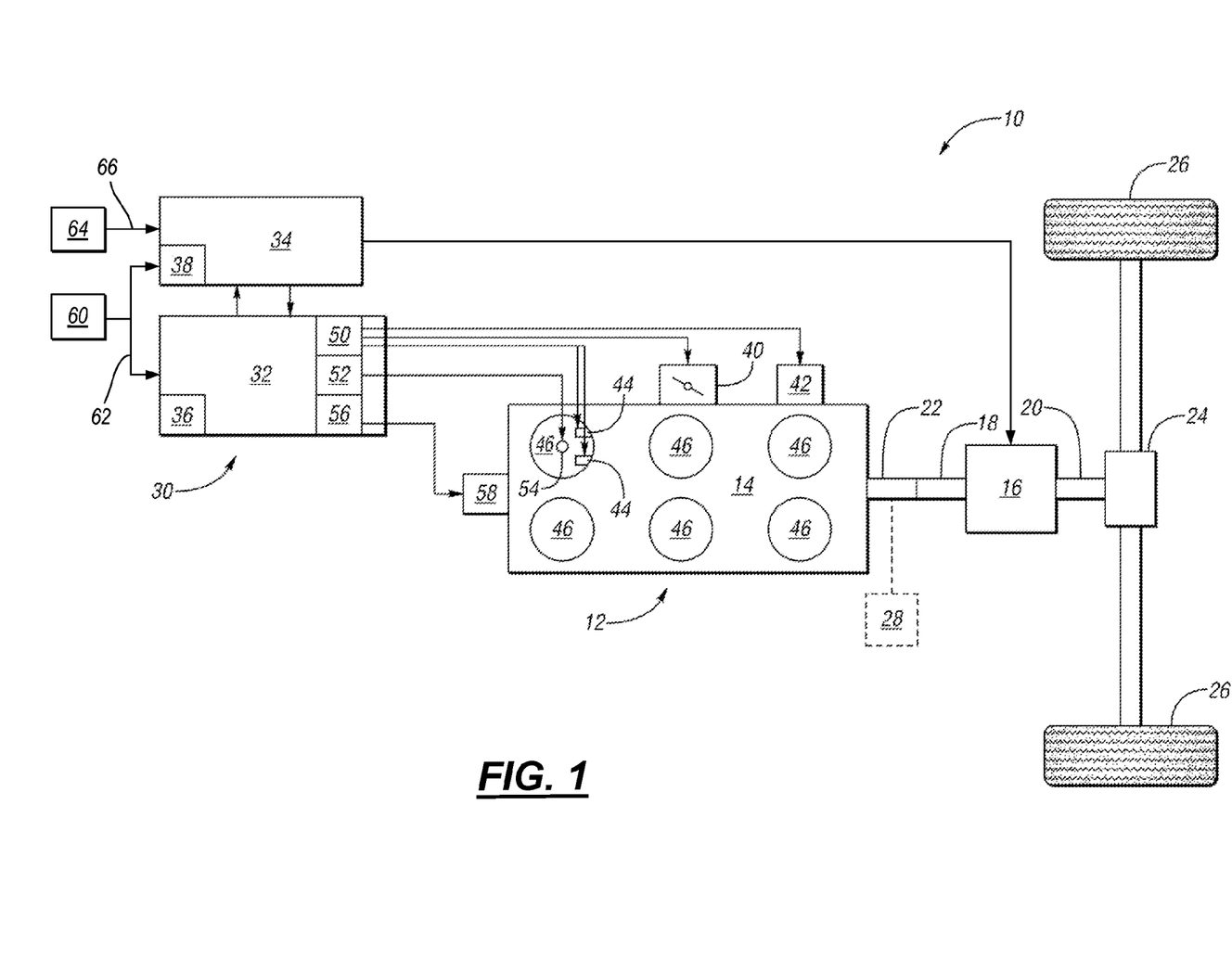
FIG. 1 is a schematic diagram of a vehicle powertrain in communication with an engine control module and a transmission control module.

Referring to the drawings, wherein like reference numbers refer to like components throughout the several views, FIG. 1 shows a vehicle 10 having a powertrain 12 that includes an engine 14 and a transmission 16. The engine 14 is a spark-ignited internal combustion engine. In another embodiment, the engine 14 may be a diesel engine without the spark actuation discussed herein. The transmission 16 may be an automatic transmission having a plurality of intermeshing gears and selectively engageable clutches that establish different speed ratios between a transmission input member 18 and a transmission output member 20. A crankshaft 22 of the engine 14 is connectable for rotation with the transmission input member 18 to provide torque from the input member 18 to the output member 20 at a gear ratio established by the transmission 16. Torque from the output member 20 is provided through a final drive mechanism 24 to vehicle wheels 26. In some embodiments, the vehicle 10 may be a hybrid vehicle having one or more electric motor/generators. For example, a motor/generator 28 may be connected with the crankshaft 22 by a belt and pulley arrangement or otherwise, and controllable to provide torque to increase torque at the crankshaft 22 or to decrease torque at the crankshaft 22, such as when operated as a generator in a regenerative braking mode.

The vehicle 10 has a control system 30 that includes at least an engine control module (ECM) 32 and a transmission control module (TCM) 34. The ECM 32 may be referred to as a first controller and the TCM 34 may be referred to as a second controller. The ECM 32 and TCM 34 are operatively connected with one another to coordinate control of the engine 14 and the transmission 16. Alternatively, the ECM 32 and the TCM 34 may be configured as a single powertrain control module having the functionality of both the ECM 32 and the TCM 34.

As will be described further below, the ECM 32 and TCM 34 may be configured to operate together to control the smooth operation of the vehicle powertrain. For example, the TCM 34 may communicate with the ECM 32 to coordinate the shifting of gears within the transmission 16 by temporarily reducing the torque on the crankshaft 22 (i.e., crankshaft torque) during the shift. Likewise, the TCM 34 may be configured to limit the maximum torque provided by the engine to protect the transmission components.

The ECM 32 includes a processor 36 configured to control engine functions. For example, the processor 36 may have a stored algorithm that determines torque commanded at the crankshaft 22 by the ECM 32 based on vehicle operating conditions, driver input and, as described herein, requests from the TCM 34 for torque management prior to and during transmission shifts. As further described below the algorithm may also determine different torque capacities at the crankshaft 22 that are available when different torque actuators are controlled to be at different states. As used herein, a "torque actuator" is a system that varies an engine parameter to affect crankshaft torque. Some of the torque actuators that may be controllable by the ECM 32 to modify torque at the crankshaft 22 include, for example, an airflow actuator or actuator module 50 that controls air flow to engine cylinders 46, a spark actuator or actuator module 52 that controls spark ignition timing, and a fuel actuator or actuator module 56 that controls fuel to the engine cylinders 46.

The TCM 34 may likewise include a processor 38 with an algorithm that is operable to control the timing and duration of transmission shifts. The TCM processor 38 may also be configured to determine a range of torque reduction at the crankshaft 22 to be requested of the ECM 32 during a shift of the transmission 16, such as an upshift. The range of torque reduction requested is based at least in part on the torque capacities determined by the ECM 32.

A request for torque or an amount of torque reduction or removal of torque reduction via control of spark, fuel or electric motor/generator is referred to as an immediate torque request or a request for immediate torque, while a request for torque or an amount of torque reduction due to control of airflow is referred to as a predicted torque request or a request for predicted torque. Changes to spark timing and changes to fuel delivery, such as fuel shutoff (also referred to as fuel cut), occur relatively quickly in comparison to a change to airflow. Airflow is therefore referred to as a relatively slow torque actuator, while spark timing and fuel shutoff are referred to as relatively fast torque actuators.

The airflow actuator provided by the engine 14 affects the torque at the crankshaft 22 due to control of airflow through the throttle 40, such as by opening or closing the throttle 40 to a greater or lesser degree, control of airflow through turbo-boosters or superchargers 42 to affect air pressure in the engine 14, and control of airflow through cam phasers 44 that control the timing of inlet valves and exhaust valves for engine cylinders 46. The airflow actuator may be part of the airflow actuator module 50 that sends actuation signals to the throttle 40, the turbobooster and/or supercharger 42 and the phasers 44. Control of torque by changes to airflow has an inherent delay between actuation or implementation of an airflow torque request and the effect of the request on crankshaft torque. Therefore, such a request is referred to as a predicted request as it is for an effect on crankshaft torque that is predicted to occur after some delay after the actuation occurs. For example, a change in throttle position will not have a full effect on crankshaft torque until air currently in the manifold and cylinders 46 is pushed through the engine 14. The response in time of crankshaft torque to a predicted torque request can vary based on many factors because of the nature of airflow control. One such factor is engine speed. Performing shifts with a predicted and immediate torque reduction can provide more overall reduction than with immediate torque reduction alone. However, more coordination of the timing of the torque requests may be necessary due to the nature of the response to predicted torque requests on gas spark-ignited engines.

The spark actuator may be a part of the spark actuation module 52 that sends actuation signals to control the timing of the spark generated by spark plugs 54 (one shown) relative to top dead center (TDC) of the pistons within the cylinders 46. For a given engine combustion mixture there is an optimum spark timing that is a function of engine speed, the amount of combustible air in the mixture, charge temperature and other factors. Timing the spark later than this optimum spark timing is referred to as spark reduction as it causes the combustion within the cylinder 46 to produce less torque at the crankshaft 22.

The fuel actuator may be part of a fuel actuation module 56 that sends actuation signals to control fuel flow such as through a fuel injector 58 for each of the cylinders 46 (one shown). When the fuel torque actuation signal is for fuel shutoff to occur, no combustion takes place in the cylinders 46 and crankshaft torque is significantly reduced.

Axle torque provided at the transmission output member 20 is determined based partially on a operator-requested axle torque and on torque intervention requests received from other vehicle systems, with the torque intervention requests being subject to limitations imposed by the TCM 34 and ECM 36 that controls and largely prevents propulsion in a direction of motion opposite the intended direction of motion and also prevents excessive deceleration of the vehicle 10. The operator may be a driver, in which case the operator-requested axle torque is the axle torque desired by the driver. In one configuration, the control algorithms performed by the TCM 34 and/or ECM 32 may be based on either desired crankshaft torque or the axle torque.

A driver-operated accelerator device 60 such as an accelerator pedal is operable to provide a driver-requested axle torque signal 62 to the ECM 32. The driver-requested axle torque signal 62 may be an electrical signal representative of the position of the accelerator device 60 which can be correlated with a driver-requested axle torque at the transmission output member 20. The axle torque request is the sum of the torque at all axles. In an all wheel-drive application, a 400 Nm request may be achieved with 200 Nm on both axles or 300 Nm on one axle and 100 Nm on the other axle.

A driver-operated braking device 64 such as a brake pedal is operable to provide a driver-requested braking torque signal 66 to the TCM 34. The driver-requested braking torque signal 66 is representative of the position of the braking device 64 which can be correlated with a driver-requested braking torque applied via a brake system applied to one or more the vehicle wheels 26. Braking torque is axle torque in a direction opposite to the driver-requested axle torque associated with the accelerator device 60.

Figure 2:
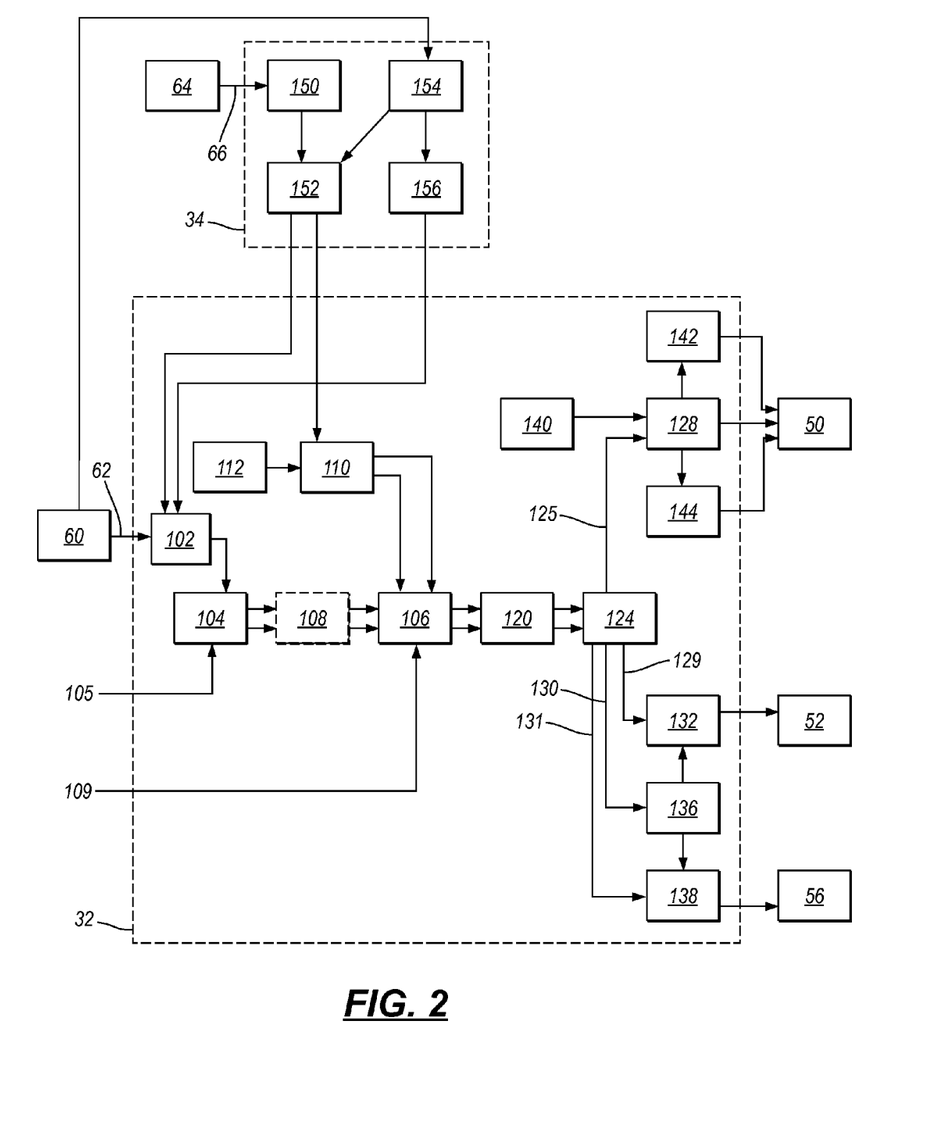
FIG. 2 is a schematic functional diagram of an embodiment of an engine control module in communication with a transmission control module.

Referring now to FIG. 2, a functional block diagram of an exemplary engine control system is presented. An exemplary implementation of an ECM 32 includes driver torque request module 102, an axle torque arbitration module 104. The driver torque request module 102 may receive all torque requests, including those from the driver input 62 and/or those from the TCM 34, and pass the desired torque on to the axle torque arbitration module 104, which may arbitrate between the intended torque input and competing requests from supervisory or traction control systems that may provide other axle torque requests 105. For example, the driver input 62 may be based on position of an accelerator pedal. The driver input 62 may also be based on cruise control, which may be an adaptive cruise control that maintains a predetermined following distance.

Torque requests may include target torque values as well as ramp requests, such as a request to ramp torque down to a minimum engine off torque or to ramp torque up from the minimum engine off torque. Axle torque requests 105 may include a torque reduction requested during wheel slip by a traction control system. Axle torque requests 105 may also include torque request increases to counteract negative wheel slip, where a tire of the vehicle slips with respect to the road surface because the axle torque is negative.

Axle torque requests 105 may also include brake management requests, vehicle over-speed torque requests, and/or low-speed vehicle creep requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests 105 may also be made by body stability control systems. Axle torque requests may further include engine cutoff requests, such as may be generated when a critical fault is detected.

The axle torque arbitration module 104 outputs a predicted torque and an immediate torque based on the results of arbitrating between the received torque requests. The predicted torque is the amount of torque that the ECM 32 prepares to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold, when the traction control system senses wheel slippage.

The immediate torque may be achieved by varying engine actuators that respond quickly, while slower engine actuators may be used to prepare for the predicted torque. For example, as described above, spark advance may be adjusted quickly, while cam phaser position and air flow may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, a throttle valve can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 104 outputs the predicted torque and the immediate torque to a propulsion torque arbitration module 106. In various hybrid implementations (i.e., including a motor/generator 28), the axle torque arbitration module 104 may output the predicted torque and immediate torque to a hybrid optimization module 108. The hybrid optimization module 108 determines how much torque should be produced by an engine and how much torque should be produced by an motor/generator 28. The hybrid optimization module 108 then outputs modified predicted and immediate torque values to the propulsion torque arbitration module 106.

The predicted and immediate torques received by the propulsion torque arbitration module 106 may be converted from an axle torque domain (torque at the wheels) into a propulsion torque domain (torque at the crankshaft). This conversion may occur before, after, as part of, or in place of the hybrid optimization module 108.

The propulsion torque arbitration module 106 may arbitrate between propulsion torque requests, including the converted predicted and immediate torques. The propulsion torque arbitration module 106 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests 109 may include torque reductions for engine over-speed protection, torque increases for stall prevention, and torque reductions requested by the TCM 34 to accommodate gear shifts. Propulsion torque requests 109 may also result from clutch fuel cutoff, which may reduce the engine torque output when the driver depresses the clutch pedal in a manual transmission vehicle.

Propulsion torque requests 109 may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine without regard to torque. The propulsion torque arbitration module 106 may still receive these shutoff requests so that, for example, appropriate data can be fed back to other torque requestors. For example, all other torque requestors may be informed that they have lost arbitration.

An RPM control module 110, also referred to as a vehicle idle control module 110, may also output predicted and immediate torque requests to the propulsion torque arbitration module 106. The torque requests from the RPM control module 110 may prevail in arbitration when the ECM 32 is in RPM mode. RPM mode may be selected when the driver removes their foot from the accelerator pedal, such as when the vehicle is idling or coasting down from a higher speed. Alternatively or additionally, RPM mode may be selected when the predicted torque requested by the driver torque request module 102 and/or axle torque arbitration module 104 is less than a calibratable torque value.

The RPM control module 110 may receive a desired RPM from an RPM trajectory module 112, and may control the predicted and immediate torque requests to reduce the difference between the desired RPM and the actual RPM. For example only, the RPM trajectory module 112 may output a linearly decreasing desired RPM for vehicle coastdown until engine RPM reaches an idle RPM. The RPM trajectory module 112 may then continue outputting the idle RPM as the desired RPM. Alternatively, the RPM control module 110 may operate at the direction of the TCM 34 when in low speed conditions.

A reserves/loads module 120 may receive the arbitrated predicted and immediate torque requests from the propulsion torque arbitration module 106. Various engine operating conditions may affect the engine torque output. In response to these conditions, the reserves/loads module 120 may create a torque reserve by increasing the predicted torque request.

For example only, a catalyst light-off process or a cold start emissions reduction process may directly vary spark advance for an engine. The reserves/loads module 120 may therefore increase the predicted torque request to counteract the effect of that spark advance on the engine torque output. In another example, the air/fuel ratio of the engine and/or the mass air flow may be directly varied, such as by diagnostic intrusive equivalence ratio testing and/or new engine purging. Corresponding predicted torque increases may be made to offset changes in the engine torque output during these processes.

The reserves/loads module 120 may also create a reserve in anticipation of a future load, such as the engagement of the air conditioning compressor clutch or power steering pump operation. The reserve for A/C clutch engagement may be created when the driver first requests air conditioning. Then, when the A/C clutch engages, the reserves/loads module 120 may add the expected load of the A/C clutch to the immediate torque request.

An actuation module 124 receives the predicted and immediate torque requests as output by the reserves/loads module 120. The actuation module 124 may determine how the predicted and immediate torque requests will be achieved. The actuation module 124 may be engine type specific, with different control schemes for gas engines versus diesel engines. In various implementations, the actuation module 124 may define the boundary between modules prior to the actuation module 124, which are engine independent, and modules that are engine dependent.

For example, in a gas engine, the actuation module 124 may vary the opening of the throttle 40, which allows for a wide range of torque control. However, opening and closing the throttle 40 may result in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 124 may generate an air torque request 125 based on the predicted torque request. The air torque request may be equal to the predicted torque request, causing air flow to be set so that the predicted torque request can be achieved simply by changes to other actuators.

An air control module 128 may determine desired actuator values for slow actuators based on the air torque request. For example, the air control module 128 may control desired manifold absolute pressure (MAP), desired throttle area, and/or desired air per cylinder (APC). Desired MAP may be used to determine desired boost, and desired APC may be used to determine desired cam phaser positions.

In gasoline systems, the actuation module 124 may also generate a spark torque request 129, a cylinder shut-off torque request 130, and a fuel mass torque request 131. The spark torque request may be used by a spark control module 132 to determine how much to retard the spark (which reduces the engine torque output) from a calibrated spark advance. The spark control module 132 controls the spark actuator module 52. In diesel systems, fuel mass may be the primary actuator for controlling engine torque output.

The cylinder shut-off torque request may be used by a cylinder control module 136 to determine how many cylinders to deactivate. The cylinder control module 136 may instruct a fuel control module 132 to stop providing fuel for deactivated cylinders and may instruct the spark control module 140 to stop providing spark for deactivated cylinders.

The fuel mass torque request 131 may be used by the fuel control module 138 to vary the amount of fuel provided to each cylinder 46. For example only, the fuel control module 138 may determine a fuel mass that, when combined with the current amount of air per cylinder 46, yields stoichiometric combustion. The fuel control module 138 may instruct the fuel actuator module 56 to inject this fuel mass for each activated cylinder 46. During normal engine operation, the fuel control module 138 may attempt to maintain a stoichiometric air/fuel ratio.

The fuel control module 138 may increase the fuel mass above the stoichiometric value to increase engine torque output and may decrease the fuel mass to decrease engine torque output. In various implementations, the fuel control module 138 may receive a desired air/fuel ratio that differs from stoichiometry. The fuel control module 138 may then determine a fuel mass for each cylinder 46 that achieves the desired air/fuel ratio.

A torque estimation module 140 may estimate torque output of the engine. This estimated torque may be used by the air control module 128 to perform closed-loop control of engine air flow parameters, such as MAP, throttle area, and phaser positions. For example only, a torque relationship such as may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 140 may determine APC based on measured MAF and current RPM, thereby allowing closed loop air control based on actual air flow. The intake and exhaust cam phaser positions used may be based on actual positions, as the phasers may be traveling toward desired positions. In addition, a calibrated spark advance value may be used. This estimated torque may be referred to as an air torque—i.e., an estimate of how much torque could be generated at the current air flow, regardless of the actual engine torque output, which varies based on spark advance.

The air control module 128 may generate a desired manifold absolute pressure (MAP) signal, which is output to a boost scheduling module 142. The boost scheduling module 142 may use the desired MAP signal to control the one or more turbochargers and/or superchargers 42.

The air control module 128 may generate a desired area signal, which is used to regulate the throttle valve 40 to produce the desired throttle area. The air control module 128 may use the estimated torque and/or the MAF signal in order to perform closed loop control. For example, the desired area signal may be controlled based on a comparison of the estimated torque and the air torque request.

The air control module 128 may also generate a desired air per cylinder (APC) signal, which is output to a phaser scheduling module 144. Based on the desired APC signal and the RPM signal, the phaser scheduling module 144 may control positions of the intake and/or exhaust cam phasers 44.

When the vehicle 10 is at rest and the braking device 64 is providing a braking torque signal 66, the transmission 16 may be disengaged from the crankshaft 22 through the use of one or more open clutches. In this manner, wear on the clutch may be reduced, and fuel economy may be improved since the engine is not loaded. When the braking device 64 is released, the clutch must be re-engaged to provide input torque to the transmission 16 and allow the vehicle to "creep" forward at a controlled rate. Likewise, the speed of the engine must be controlled as the torque is re-applied to prevent a stall condition. The action of providing creep torque is a desirable feature because it can improve low vehicle speed drivability, and can also provide anti-rollback mitigation on grades. For this reason the "Creeping" feature (that is provided naturally on transmissions having a torque converter) must be emulated through torque control on automatic transmission employing friction input clutch technology, such as on a DCT or MTA transmission.

Therefore, the transmission may include a creep control module 150 that is in communication with the braking device 64 and configured to receive an indication of the braking torque signal 66. Upon seeing the braking torque signal 66 transition from an applied state to an un-applied state, the creep control module 150 may activate a creep mode within a transmission load request module 152. As will be discussed below, the transmission load request module 152 may then generate a torque request, which may be sent to the driver torque request module 102 and/or the RPM control module 110. As described above, the request to driver torque request module 102 may specify the requested wheel torque to accelerate the vehicle up to some substantially constant idle/creep speed. The request to the RPM control module 110 may correspondingly control the speed of the engine 12 to avoid the occurrence of a stall condition. As such, the actual axle torque is the amount of torque that is transmitted from the engine 12 through the transmission 16 to keep the engine at the desired idle speed.

Typically following the deactivation/release of the braking device 64, a driver may either re-apply the braking device, thus bringing the vehicle to a stop, or may actuate the accelerator device 60 to provide a desired torque to the wheels 26. In the case of a subsequent acceleration, a launch control module 154 may direct the TCM 34 into a controlled launch-acceleration mode. As such, the launch control module 154 may direct the transmission load request module 152 and an engine speed request module 156 to provide an accelerating torque request to the driver torque request module 102.

Figure 3:
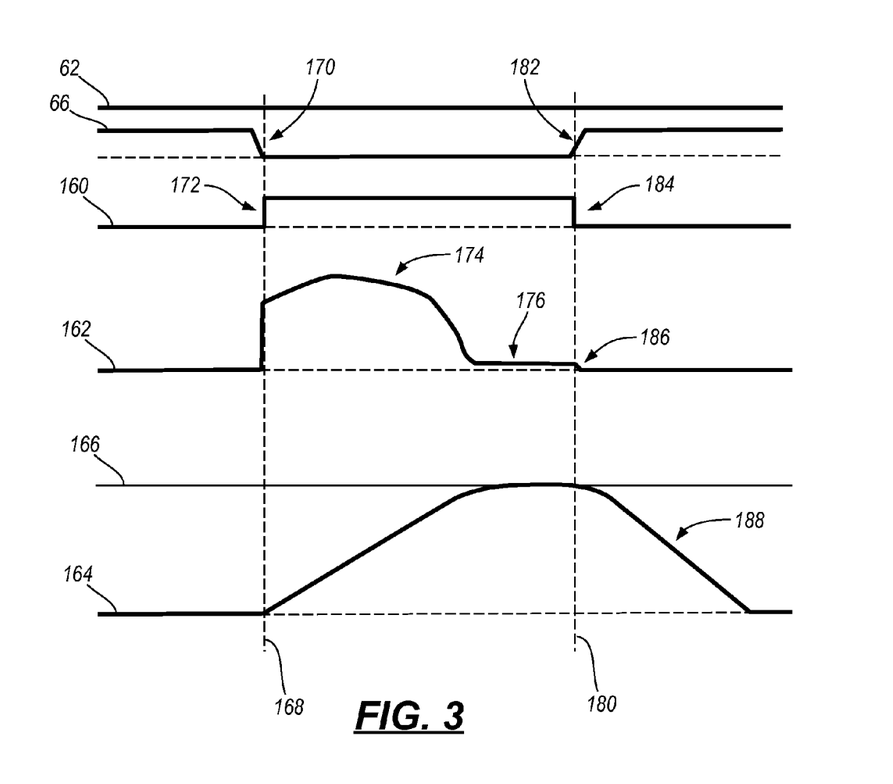
FIG. 3 is a schematic graph of transmission torque and speed during a creep-mode engine control.
Figure 5:
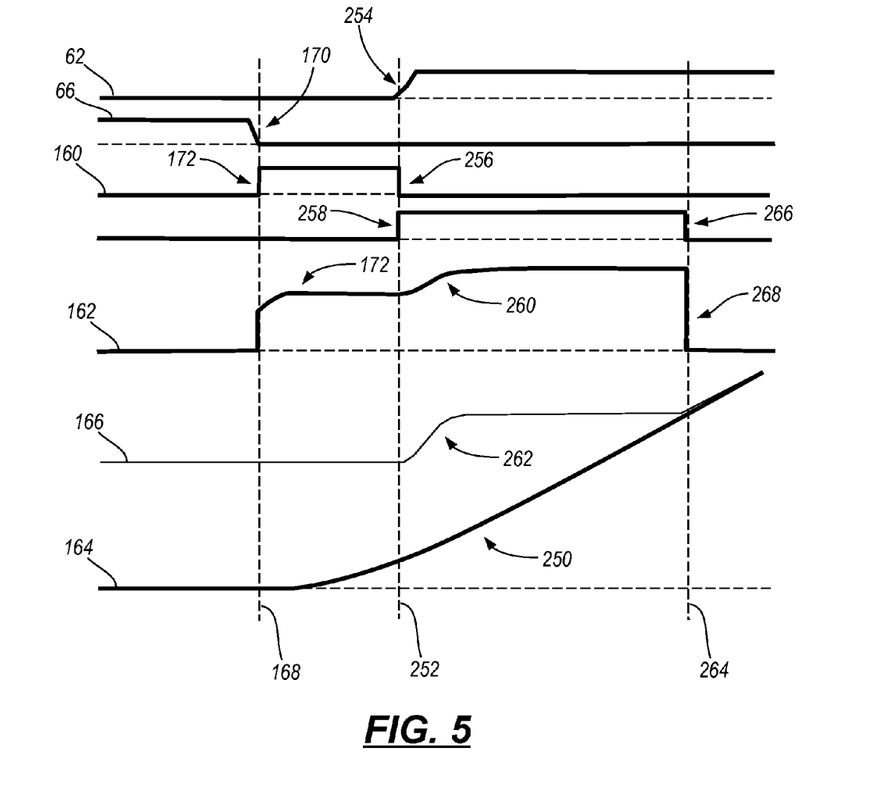
FIG. 5 is a schematic graph of transmission torque and speed during a launch-mode engine control.

FIG. 3 illustrates a schematic diagram of various engine/transmission states during creep mode, which may be activated by the creep control module 150. Likewise, FIG. 5 illustrates a schematic diagram of various engine/transmission states during launch mode, which may be activated by the launch control module 154.

FIG. 3 illustrates five distinct graphs that are coordinated in time (i.e., time being represented along the common X-Axis). Shown from top-to-bottom are: the driver-requested acceleration torque signal 62; the driver-requested braking torque signal 66; the creep mode state 160 (as output by the creep control module 150); the propulsion torque 162 (at the transmission input shaft 18); and the transmission input clutch shaft angular velocity 164 relative to the engine idle speed 166. As shown, at time 168, the brake pedal is released by the driver (generally at 170), and the transmission input clutch angular velocity 164 is less than the engine idle speed 166. In view of these two states, the creep control module 150 may initiate creep mode, for example, by transitioning from low to high (generally at 172).

Once creep mode is initiated at 172, the clutch may progressively apply to begin receiving torque from the engine 12/crankshaft 22. Initially the propulsion torque 162 is ramped to a high state while in a torque-control mode (generally at 174) to overcome static friction of the vehicle and drivetrain, and to place the vehicle 10 in motion. At the same time, the engine speed 166 at the crankshaft is being controlled in an informed, closed loop manner to maintain a constant speed despite the increased resistance torque imposed by the transmission 16. Such idle speed control is performed, for example, by the RPM control module 110 in view of the estimated propulsion torque, as well as using other closed loop PID control techniques.

Over time, the propulsion torque 162 at the input shaft 18 of the transmission 16 may cause the transmission and vehicle to accelerate to the engine idle speed 166. At that point, the commanded propulsion torque 162 may be transitioned from a creeping torque-control mode 174 to a speed control mode (generally at 176), where propulsion torque 162 is modulated solely to maintain the constant transmission input shaft angular velocity 164.

At a second time 180, where the creep control module 150 detects the application of the braking device 60 (generally at 182), the creep control module 150 may de-activate the creep mode (at 184), disengage the transmission clutch (thus removing the torque load from the crankshaft (at 186), and allow the transmission input shaft angular velocity 164 to decelerate in response to the friction or regenerative braking of the vehicle (generally at 188).

The TCM 34 may avoid commanding a propulsion torque 162 on the engine 12 at a rate faster than the ECM 32 can add load and maintain a stable idle without deep sags. The TCM 34 may transmit the propulsion torque command 162 with a signal that leads the actual application of input clutch load to account for delays in increasing torque on gasoline spark ignited engines.

The propulsion torque 162 command may specify the amount of torque needed from the engine 12 on the input of the transmission 18 to accelerate the vehicle 10 at the desired creep rate. Said another way, the commanded propulsion torque 162 should approach 0 Nm as the transmission input shaft angular velocity 164 approaches the engine idle speed 166.

During the creep torque-control mode 174, the TCM 34 may ramp on its propulsion torque 162 command at a rate desired for good creep response and feel. It should also avoid controlling the input clutch pressure/load with a closed loop speed controller having a response rate that similar to or faster than the ECM's closed loop idle speed control.

Figure 4:
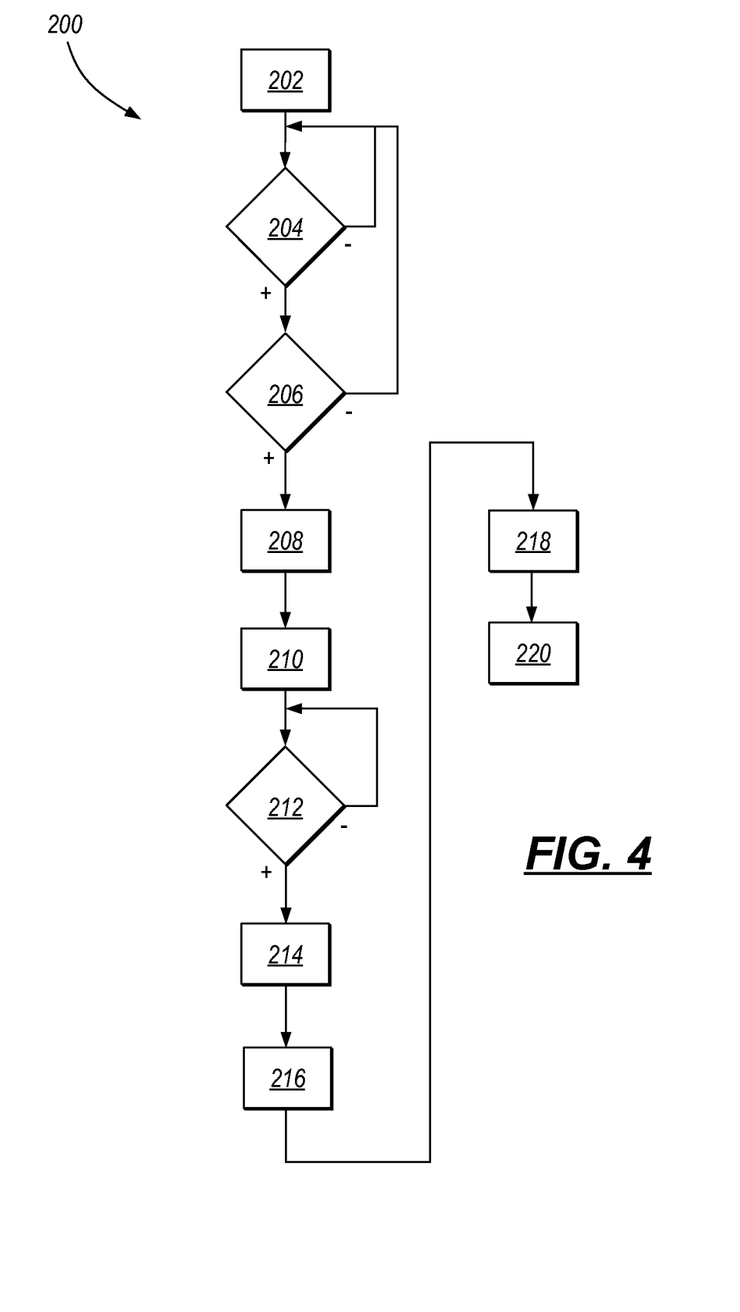
FIG. 4 is a schematic flow chart of an embodiment of a method for initiating creep-mode engine control.

FIG. 4 illustrates a method 200 of implementing a vehicle creep algorithm on a vehicle with a DCT. As shown, the method may begin at step 202 when the transmission input clutch is disengaged. In step 204, a controller may compare a sensed transmission input clutch shaft angular velocity 164 to the engine idle speed 166, if the velocity 164 is below the idle speed 166, the controller may then monitor a driver-requested braking torque signal 66 to detect if a brake has been disengaged at step 206. If the brake has been disengaged, a clutch may be applied in step 208 in a controlled manner to controllably couple the crankshaft 22 with the input shaft of the transmission. An open loop torque command may be generated in step 210 to then controllably increase the input torque to the transmission, while the engine idle speed is maintained. The transmission may compare the transmission input shaft angular velocity 164 with the engine idle speed 166 in step 212, and may transition to a speed-control mode 214 if the transmission input shaft angular velocity 164 is within a predefined tolerance of the engine idle speed 166. The transmission input shaft angular velocity 164 may then be maintained at the engine idle speed 166 in step 216 until creep mode is deactivated in step 218. Once creep mode is deactivated in step 218 (such as by the reapplication of the braking device 64, the application of the accelerator 60, or the transmission input shaft angular velocity 164 exceeding the engine idle speed 166), the input clutch may be disengaged in step 220, thus separating crankshaft 22 from the input shaft 18 of the transmission 16.

FIG. 5 illustrates six distinct graphs that are coordinated in time (i.e., time being represented along the common X-Axis), and generally illustrate launch mode being activated following creep mode. Five of these graphs are similar to that shown in FIG. 3. Shown from top-to-bottom are: the driver-requested acceleration torque signal 62; the driver-requested braking torque signal 66; the creep mode state 160 (as output by the creep control module 150); the launch mode state 250 (as output by the launch control module 154); the propulsion torque 162 (at the transmission input shaft 18); and the transmission input shaft angular velocity 164 relative to the engine idle speed 166. As shown, at time 168, the brake pedal is released by the driver (generally at 170), and the transmission input shaft angular velocity 164 is less than the engine idle speed 166. In view of these two states, the creep control module 150 may initiate creep mode, for example, by transitioning from low to high (generally at 172).

At a second time 252, the accelerator device 60 may be actuated to transition the driver-requested axle torque signal 62 from low to high (generally at 254). This sensed signal may cause the creep mode to deactivate (generally at 256), while the launch mode is initiated by the launch control module 154 (generally at 258). Once activated, the launch control module 154 may impose engine speed maximum and minimum limits on the engine idle speed 164, and may be operated in a speed control mode (generally at 260). As such, the engine speed control set point 166 may be increased in anticipation of subsequent higher-rpm acceleration (generally at 262).

When launching with an input clutch transmission, it is desirable to avoid creating more slip than necessary between the engine idle speed 164 and the transmission input clutch shaft angular velocity 164. Higher levels of slip will result in higher levels of clutch wear, which may degrade durability of the input clutch. On the other hand, there is also a need to elevate the engine speed above normal idle speeds to increase the available engine power for launch and avoid clutch "Jutter". "Jutter" is the resonance of the clutch at a certain amount of slip across the clutch interface.

In a torque or power based launch, the TCM 34 would have to control the clutch torque to keep the engine speed at the desired level for the launch. This can be impractical because of clutch hardware response and the high frequency torque that it ends up transmitting to the wheels. The present system instead performs speed control at the desired level, while the TCM 34 controllably ramps on the transmission load at a rate calculated to achieve the desired acceleration rate.

While in launch mode, the propulsion torque command 162 may be modulated to specify the amount of torque needed from the engine 12 at the input of the transmission 16 to accelerate the vehicle 10 at the desired launch rate. Contrary to the creep mode, the propulsion torque command 162 should not approach 0 Nm as the transmission input shaft angular velocity 164 approaches the engine idle speed 166. This is because there will typically be a desire to continue acceleration of the vehicle 10 after the transmission input shaft angular velocity 164 meets the engine idle speed 166.

Once the transmission input shaft angular velocity 164 meets the increased launch controlled engine speed 166 (i.e., at time 264), launch mode may be deactivated (generally at 266), and the propulsion torque command 162 from the transmission load request module 152 may drop to zero (generally at 268) to allow the axle torque to be fully controlled by the driver (rather than controlled by the TCM 34). In another configuration, the ECM 32 may blend the torque from the speed controller request module 156 to the normal pedal interpretation torque request (i.e., the driver-requested axle torque signal 62) when the launch mode is ended by the TCM 34.

Referring again to FIG. 2, the TCM 34 will indicate to the ECM 32 when the system is operating in either creep mode or launch mode. When the TCM 34 indicates launch mode, the ECM 32 will arbitrate the TCM's launch speed control request as a driver request, meaning that it may supersede the actual driver request, though other torque intervention functions may be able to win arbitration and modify the torque or speed. For example traction control should be able to reduce torque from the launch function. When the TCM 34 indicates creep mode, the ECM 32 may add the TCM's propulsion torque 162 request as an open loop control parameter in the RPM control module 110, which may correspondingly increase the zero pedal torque.

In one configuration, the creep mode may not be used when the input clutch speed is above the idle speed. For example, if the driver eliminates the braking signal with the input clutch speed below idle speed, the creep mode will return. If the driver eliminates the braking signal with the input clutch speed above the idle speed, however, the creep mode will not be used.

As may be understood, though the presently disclosed techniques and methodologies are generally described with reference to a Dual Clutch Transmission, they are equally applicable, and can be used with a Manual Transmission (MTA), or any other similarly configured transmission that may rely on synchronous speed-matching gear shifts.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A method of controlling the performance of a vehicle from a stationary condition, the method comprising:
detecting the disengagement of a driver-operated braking device;
applying a friction clutch to couple an engine crankshaft of the vehicle with an input shaft of the transmission;
determining an open-loop torque command to accelerate the vehicle at a predetermined rate;
providing the open-loop torque command to an engine controller to controllably increase the input torque to the transmission;
operating a closed loop engine speed control module to prevent the crankshaft speed from slowing below a predetermined engine idle speed.

2. The method of claim 1, further comprising reducing a transmission input torque to zero if the driver-operated braking device is re-engaged.

3. The method of claim 2, further comprising disengaging the friction clutch to decouple the engine crankshaft from the input shaft of the transmission if the driver-operated braking device is re-engaged.

4. The method of claim 1, further comprising performing a speed-controlled launch if the driver-operated accelerator device is engaged.

5. The method of claim 4, wherein the speed-controlled launch includes providing a propulsion torque command to the engine controller to accelerate the vehicle at a desired launch rate.

6. The method of claim 5, further comprising increasing an engine speed set point following the engagement of the driver-operated accelerator device.

7. The method of claim 1, further comprising deactivating the closed loop engine speed control module if the transmission input shaft speed exceeds the predetermined engine idle speed by a predetermined threshold.

8. The method of claim 1, wherein the provided torque command decreases as the speed of the input shaft of the transmission approaches the predetermined engine idle speed.

9. A method of controlling the performance of a vehicle from a stationary condition, the method comprising:
operating a vehicle powertrain in a creep mode following the disengagement of a driver-operated braking device; and
operating the vehicle powertrain in a launch mode following an engagement of a driver-operated acceleration device subsequent to the disengagement of the driver-operated braking device;
wherein operating a vehicle powertrain in a creep mode includes:
applying a friction clutch to couple an engine crankshaft of the vehicle powertrain with an input shaft of the transmission;
determining an open-loop torque command to accelerate the vehicle powertrain at a predetermined rate;
providing the open-loop torque command to an engine controller to controllably increase the input torque to the transmission; and
operating a closed loop engine speed control module to prevent the crankshaft speed from slowing below a predetermined engine idle speed.

10. The method of claim 9, wherein operating a vehicle powertrain in a launch mode includes providing a propulsion torque command to the engine controller in a closed-loop manner to accelerate the vehicle at a desired launch rate.

11. The method of claim 10, wherein operating a vehicle powertrain in a launch mode further includes increasing an engine speed set point following the engagement of the driver-operated accelerator device.

12. The method of claim 9, further comprising deactivating the creep mode if the driver-operated braking device is re-engaged prior to the engagement of a driver-operated acceleration device.

13. The method of claim 12, wherein deactivating the creep mode includes disengaging the friction clutch to decouple the engine crankshaft from the input shaft of the transmission.

14. The method of claim 9, further comprising deactivating the launch mode if the speed of the transmission input shaft meets a launch controlled engine speed.

15. The method of claim 14, wherein deactivating the launch mode includes varying the propulsion torque command directly in response to the engagement of a driver-operated acceleration device.

16. A method of controlling the performance of a vehicle from a stationary condition, the method comprising:
operating a vehicle powertrain in a creep mode following the disengagement of a driver-operated braking device; and
operating the vehicle powertrain in a launch mode following an engagement of a driver-operated acceleration device subsequent to the disengagement of the driver-operated braking device;
wherein operating a vehicle powertrain in a creep mode includes:
applying a friction clutch to couple an engine crankshaft of the vehicle powertrain with an input shaft of the transmission;
determining an open-loop torque command to accelerate the vehicle powertrain at a predetermined rate;
providing the torque command to an engine controller to controllably increase the input torque to the transmission;
operating a closed loop engine speed control module to prevent the crankshaft speed from slowing below a predetermined engine idle speed; and
wherein operating a vehicle powertrain in a launch mode includes providing a propulsion torque command to the engine controller in a closed-loop manner to accelerate the vehicle at a desired launch rate, and increasing an engine speed set point following the engagement of the driver-operated accelerator device.

17. The method of claim 16, further comprising deactivating the creep mode if the driver-operated braking device is re-engaged prior to the engagement of a driver-operated acceleration device.

18. The method of claim 17, wherein deactivating the creep mode includes disengaging the friction clutch to decouple the engine crankshaft from the input shaft of the transmission.

19. The method of claim 16, further comprising deactivating the launch mode if the speed of the transmission input shaft meets a launch controlled engine speed.

20. The method of claim 19, wherein deactivating the launch mode includes varying the propulsion torque command directly in response to the engagement of a driver-operated acceleration device.

* * * * *